United States Patent
Fomenko et al.

(10) Patent No.: US 7,058,933 B2
(45) Date of Patent: Jun. 6, 2006

(54) EXTENDING CUSTOM APPLICATION DEVELOPMENT ENVIRONMENT MODULES TO A SECOND APPLICATION DEVELOPMENT ENVIRONMENT

(75) Inventors: Anatoli Fomenko, Menlo Park, CA (US); Dmitri V. Chiriaev, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 579 days.

(21) Appl. No.: 10/242,269

(22) Filed: Sep. 11, 2002

(65) Prior Publication Data

US 2004/0049776 A1    Mar. 11, 2004

(51) Int. Cl.
*G06F 9/45* (2006.01)
*G06F 9/44* (2006.01)

(52) U.S. Cl. ............... 717/145; 717/109; 717/118

(58) Field of Classification Search ........... 717/141, 717/109, 138, 174, 113–116; 709/236, 224; 718/101; 714/25; 719/328; 715/762, 783
See application file for complete search history.

(56) References Cited

U.S. PATENT DOCUMENTS

| | | | | |
|---|---|---|---|---|
| 59,559 | A | * | 11/1866 | Reddy et al. ............... 111/66 |
| 99,845 | A | * | 2/1870 | Passanisi ................. 292/166 |
| 177,412 | A | * | 5/1876 | Todd ......................... 84/170 |
| 186,250 | A | * | 1/1877 | Gardas et al. ............... 76/61 |
| 6,026,238 | A | * | 2/2000 | Bond et al. ................ 717/141 |
| 6,230,318 | B1 | | 5/2001 | Halstead et al. ............. 717/10 |
| 6,263,492 | B1 | | 7/2001 | Fraley et al. ................. 717/5 |
| 6,490,590 | B1 | * | 12/2002 | Fink ......................... 707/100 |
| 6,826,483 | B1 | * | 11/2004 | Anderson et al. ............ 702/13 |

* cited by examiner

*Primary Examiner*—Wei Zhen
*Assistant Examiner*—Anna Deng
(74) *Attorney, Agent, or Firm*—Gunnison, McKay & Hodgson, L.L.P.

(57) ABSTRACT

Custom application development environment modules may be designed to work with a first application development environment. This functionality may be extended to a second application development environment by first creating user interface elements for the second application development environment. User interface elements from the custom application development environment modules may be separated, forming user interface elements for the first application development environment. New general elements may then be created, which are compatible with both the first application development environment and the second application development environment. The general elements may be combined with non-user interface elements from the custom application development environment modules to arrive at a series of generalized classes. One or more of the generalized classes may then be referenced in the user interface elements for the first application development environment and the user interface elements for the second application development environment.

17 Claims, 2 Drawing Sheets

EXTENDING CUSTOM APPLICATION DEVELOPMENT ENVIRONMENT MODULES TO A SECOND APPLICATION DEVELOPMENT ENVIRONMENT

FIELD OF THE INVENTION

The present invention relates to the field of computer software. More specifically, the present invention relates to software application frameworks.

BACKGROUND OF THE INVENTION

NetBeans is an application development environment that programmers may use to write, compile, debug, and deploy programs. It is an open-source tool and is used by many programmers as a powerful tool aiding in the creation of software applications.

Forte™ for Java™ (FFJ), also known as Sun One Studio™ for Java™, deployed by Sun Microsystems™, Inc. of Palo Alto, Calif., is a product family that extends the NetBeans Tools platform with custom modules for developing applications for the Java platform. Since it is based on the NetBeans platform, however, it has certain peculiarities. NetBeans also does not have direct access to the user-interface facilities of the operating system, thus resulting in applications that may have interfaces varying wildly from the operating systems on which they are running.

Furthermore, NetBeans uses dynamic menu generation. After the first time a menu is created, the menu is cached, and thus subsequent calls' performances are acceptable. However, the first menu appearance may take a longer time to load. Additionally, due to a module initiation model, NetBeans has a long perceived startup time.

Another open source framework known as Eclipse runs on a Standard Widget Toolkit (SWT), which works differently than NetBeans. SWT also has access to the user-interface facilities of the operating system. Additionally, Eclipse has a larger variety of specialized modules than NetBeans.

Therefore, it makes sense to extend the specialized modules available in FFJ to Eclipse. However, extending this functionality to Eclipse is not a simple task. One solution is to rewrite everything from scratch. This, however, is extremely time-consuming, and two separate sets of source code need to be maintained (one for NetBeans and one for Eclipse). Another possible solution is to write a conversion module. FFJ on Eclipse would have an additional plug-in that would be called by the plug-in stubs. The conversion module would, in turn, call the FFJ modules. While this solution requires less work than a complete rewrite, it creates another level of indirection that would slow down already slow FFJ modules. Additionally, the FFJ on Eclipse would be a mix of components from both platforms that might be confusing to a user considering that they may have a different look and feel.

What is needed is a solution for extending FFJ to Eclipse in an efficient and reliable manner.

BRIEF DESCRIPTION

Custom application development environment modules may be designed to work with a first application development environment. This functionality may be extended to a second application development environment by first creating user interface elements for the second application development environment. User interface elements from the custom application development environment modules may be separated, forming user interface elements for the first application development environment. New general elements may then be created, which are compatible with both the first application development environment and the second application development environment. The general elements may be combined with non-user interface elements from the custom application development environment modules to arrive at a series of generalized classes. One or more of the generalized classes may then be referenced in the user interface elements for the first application development environment and the user interface elements for the second application development environment.

BRIEF DESCRIPTION OF THE DRAWINGS

The accompanying drawings, which are incorporated into and constitute, a part of this specification, illustrate one or more embodiments of the present invention and, together with the detailed description, serve to explain the principles and implementations of the invention.

In the drawings.

DETAILED DESCRIPTION

Figure 1:
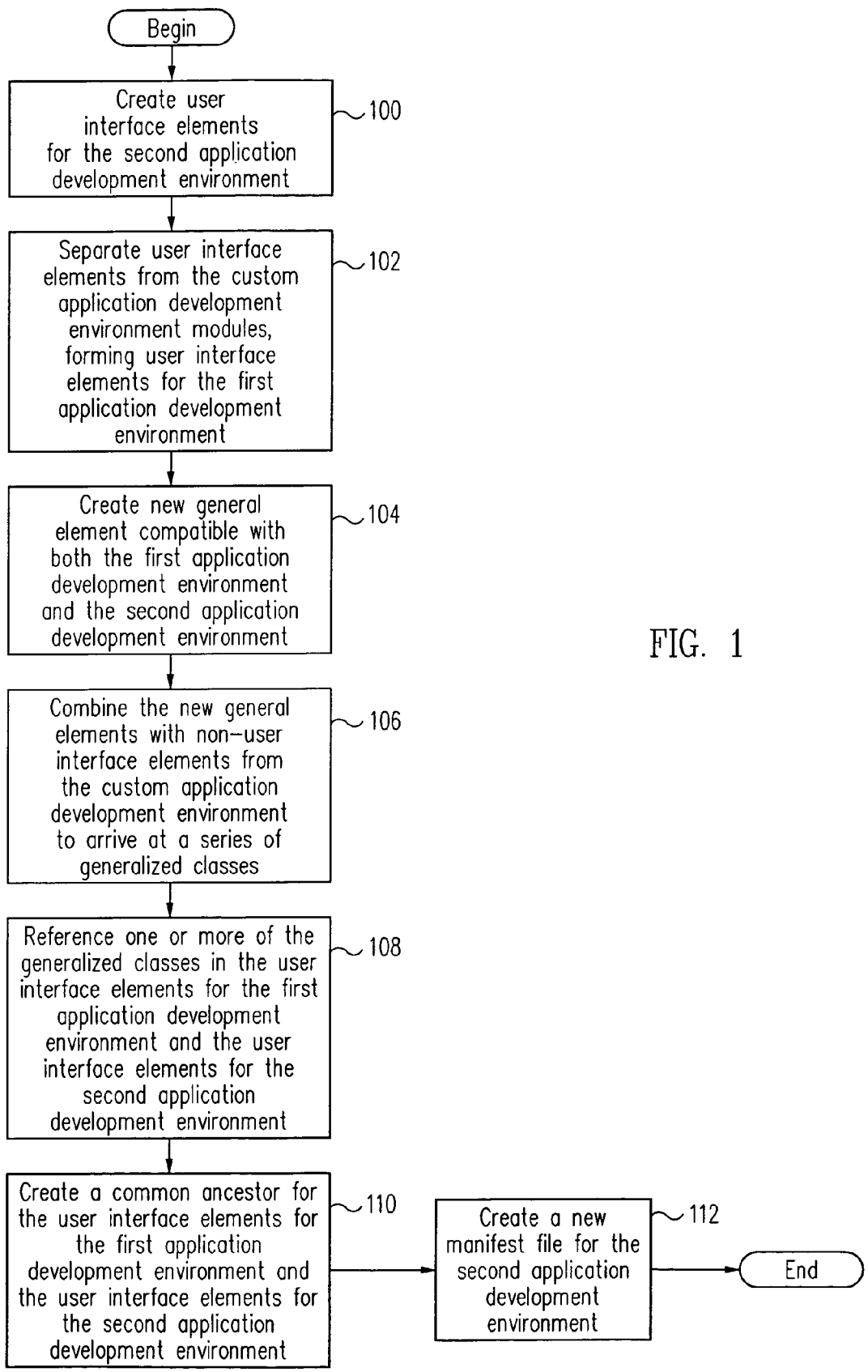
FIG. 1 is a flow diagram illustrating a method for extending custom application development environment modules from a first application development environment to a second application development environment in accordance with a specific embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention decouples the business logic of each FFJ module from the graphical user interface (GUI). Then the Eclipse plug-in specific code may be written for each FFJ module and the business logic called from there. This allows FFJ modules to be extended to Eclipse, and this solution may also be additionally used to extend FFJ modules to other platforms.

Typically, FFJ module functionality coupled functionality related to a Netbeans module with the FFJ module specific functionality. The coupling is of two types: GUI related and plug-in framework related. To move from this existing structure, the following method may be performed. First, GUI parts are created for Eclipse. Then all NetBeans GUI related functionality may be moved to separate classes. General parts may then be created for both plug-ins. Manifest files may be created for the Eclipse plug-in.

What follows is an example of the typical general look of the NetBeans and eclipse plug-ins that illustrate how the method can be implemented in order to make the functionality of the NetBeans modules run as Eclipse plug-ins. One of ordinary skill in the art will recognize that many other implementations are possible.

It makes sense to organize the software in a way such that it will support both NetBeans and Eclipse. A plug-in is just a thin layer of the total functionality. The main functionality will be the general package. Since there will be more than one plug-in, it makes sense to put generic plug-in code (mostly interfaces and abstracted classes) in a separate package.

A typical FFJ plug-in (that is, a NetBeans module) is located in the java package: com.sun.forte4j.<module name>, for example com.sun.forte4j.somemodule, with additional packages for more specific information such as
com.sun.forte4j.somemodule.client,
com.sun.forte4j.somemodule.server,
com.sun.forte4j.somemodule.web, and
com.sun.forte4j.somemodule.editor.

In a specific embodiment of the present invention, the packages might look like the following:
General functionality: com.sun.s1studio.somemodule
Specific module functionality: com.sun.s1studio.<module-name>.<specific-functionality>
Generic plug-in related functionality (common for NetBeans module and Eclipse plug-in): com.sun.s1studio.<module-name>.plugin
Netbeans module specific packages: com.sun.s1studio.<module-name>.nb
Eclipse plug-in specific packages: com.sun.s1studio.<module-name>.eclipse The last 3 package name "types" may be reserved for plug-in related functionality. Since Eclipse uses a different GUI library than NetBeans, the GUI related functionality may be done separately for Eclipse and NetBeans.

Thus, the example above will look like:
com.sun.s1studio.somemodule.plugin
com.sun.s1studio.somemodule.nb
com.sun.s1studio.somemodule.eclipse
com.sun.s1studio.somemodule.client
com.sun.s1studio.somemodule.server
com.sun.s1studio.somemodule.web
com.sun.s1studio.somemodule.eclipse.editor
com.sun.s1studio.somemodule.nb.editor Turning to the generic plug-in structure, classes that contain generic functionality of a plug-in may have their interfaces, common for Eclipse and NetBeans plug-ins. For example:

```
public interface Editor{
    public void setText (String text);
    public String getText( );
    public void paste (String text);
    public void selectAll( );
    public int getLine( );
    public String getSelectedText( );
    ...
}
public interface StatusBar    {
    public void setText (String text);
}
public interface Project    {
    /**
     * Returns all Java source files that make up a project.
     */
    public Collection getAllFiles( );
    /**
     * Returns the Java source files that are currently opened
     */
    public Collection getOpenedFiles( );
    /**
     * Returns the Java source files that are currently selected.
     */
    public Collection getSelectedFiles( );
    ...
}
```

Additionally, a common ancestor for both plug-ins may be created:

```
import java.awt.Frame;
public abstract class GeneralPlugin {
    public abstract Project getActiveProject( );
    /**
     * Returns the main Frame of the application.
     *.
    public abstract Frame getMainFrame( );
    /**
     * Returns the active status bar
     */
    public abstract StatusBar getStatusBar( );
    ...
    /**
     * Plug-in public "business" methods
     */
    ...
}
```

Turning to the typical NetBeans plug-in structure, the following is a typical NetBeans plug-in class. Most method implementations are skipped.

```
import java.awt.Frame;
import javax.swing.Action;
import javax.swing.JEditorPane;
import org.openide.Topmanager;
import org.openide.cookies.EditorCookie;
import org.openide.filesystems.LocalFileSystem;
import org.openide.loaders.DataFolder;
import org.openide.loaders.DataLoader;
import org.openide.loaders.DataObject;
import org.openide.nodes.Node;
import org.openide.util.HelpCtx;
import org.openide.util.NbBundle;
import org.openide.util.actions.CookieAction;
```

-continued

```
import org.openide.util.actions.SystemAction;
public class NbPlugin extends CookieAction {
    private statis final Class [ ] COOKIE_CLASSES – new Class [ ]
    {
        EditorCookie.class, DataFolder.class
    }
    /**
    * The name of the action to display in menus.
    */
    private String name;
    /**
    * The actual plugin implementation.
    */
    private GeneralPlugin plugin;
    public NbPlugin( ) {
        initPopupMenus( );
    }
    /**
    * Get a help context for the action.
    */
    public String getname( )      {
        return name;
    }
    /**
    * Get the cookies for this action.
    */
    protected java.lang.Class[ ] cookieClasses( )   {
        return COOKIE_CLASSES;
    }
    /**
    * Indicates whether the action should be enabled based on the
    * currently activated nodes.
    */
    protected boolean enable (Node[ ] nodes) {
    }
    /**
    * Initializes the action.
    */
    protected void initialize( )
    {
        super.initialize( );
        putProperty(Action.SHORT_DESCRIPTION, NbBundle.
    getMessage (NBPlugin.class, "HINT_Action"));
        //plugin variable is initialized here with NetBeans specific
        // implementation of the GeneralPlugin interface
    }
    /**
    * Get the mode of the action (how strict it should be about cookie
        support
    */
    protected int mode( )    {
    }
    /**
    * Performs the action based on the currently activated nodes.
    */
    protected void performAction (org.openide.nodes.Node[ ] nodes) {
    }
}
```

These NetBeans plug-in class methods may call the functional classes that are common for both plug-ins. At some point, GUI classes will be called. The GUI classes will be different for different plug-ins. But they will extend the same abstract class, according to the Factory Method design pattern. Another way of moving from existing Netbeans GUI implementation classes to Eclipse implementation is by using the Adapter design pattern. For example, the class org.openide.explorer.propertysheet.PropertySheet is widely used in NetBeans and FFJ. This class extends Java Swing class NetBeans and FFJ. This class extends Java swing class javax.swing.JPanel. In Eclipse, the class extending class org.eclipse.swt.widgets.Composite has to be moved. It either can be done by the plug-in implementor, or Swing/SWT Bridge can be used.

Turning to the typical Eclipse plug-in structure, the following is such an example (assuming that the plug-in has GUI):

```
import org.eclipse.core.runtime.CoreException;
import org.eclipse.core.runtime.IPluginDescriptor;
import org.eclipse.ui.plugin.AbstractUIPlugin;
import org.eclipse.ui.IWorkbench;
public class EclipsePlugin extends AbstractUIPlugin {
    /** The only instance. */
    private static EclipsePlugin eclipsePlugin;
    GeneralPlugin plugin;
    /**
    * Creates a new EclipsePlugin object.
    */
    public EclipsePlugin (IPluginDescriptor descriptor)    {
    }
    public void shutdown ( ) throws CoreExcetion         {
    }
    public void startup( ) throws CoreException   {
        //plugin variable is initialized here with an instance of the
        //Eclipse specific class implementing interface
        //GeneralPlugin
    }
    /**
    * Returns the dialog settings for this UI plug-in
    * Implementation of this method is not required, according to the
    * Eclipse framework design.
    */
    public IDialogSettings getDialogSettings( )   {
    }
    /**
    * Returns the image registry for this UI plug-in
    * Implementation of this method is not required, according to the
    * Eclipse framework design
    */
    public IPreferenceStore getPreferenceStore( ) {
    }
    /**
    * Returns the Platform UI workbench
    * Implementation of this method is not required, according to
    * Eclipse framework design.
    */
    public IWorkbench getWorkbench ( ) {
    }
}
```

This Eclipse plug-in class method may call the functional classes that are common for both plug-ins. At some point, the GUI classes will be called. The GUI classes will be different for different plug-ins, but they will extend to the same abstract class, according to the factory Method design pattern.

Turning to the manifest file, a manifest file is a file indicating what a virtual machine should do with a file or module. For example, it may have tags indicating how a module should be loaded. The following is a typical NetBeans plug-in manifest file:

```
<?xml version="1.0" encoding="UTF-8"?>
<!DOCTYPE filesystem PUBLIC "-//NetBeans//DTD Filesystem 1.1//EN"
   "http://www.netbeans.org/dtds/filesystem-1_1.dtd">
```

-continued

```
<filesystem>
    <folder name="Menu">
        <folder name = "Build">
            <file name = "com-sun-s1studio-somemodule-nb-NbPlugin.instance"/>
                <attr name="org-openide-actions-CleanAllAction.instance/com-
            sun-s1studio-somemodule-nb-NnPlugin.instance" boolvalue="true".>
    . . . more atttributes . . .
    </folder>
    . . . more folders . . .
</filesystem>
```

In a specific embodiment of the present invention, an eclipse plug-in manifest file may be created. The result may be the following:

```
<?xml version="1.0" encoding="UTF-8"?>
<plugin id="com.sun.sltudio.somemodule.eclipse"
        name= "Some Module Plug-in" version="@BUILD.VERSION.ECLIPSE@"
        provider-name="Sun Microsystems"
        class= "com.sun.s1studio.somemodule.eclipse.EclipsePlugin">
    <runtime>
        <library name=somemodule-eclipse-bundle-@BUILD.VERSION.ECLIPSE@.jar">
            <export name="com.sun.s1studio.somemodule.*" />
        </library>
    </runtime>
    <requires>
    <import plugin="org.eclipse.core.resources" />
    <import plugin="org.eclipse.core.runtime" />
    <import plugin="org.eclipse.jdt.core" />
    <import plugin="org.eclipse.swt" />
    <import plugin="org.eclipse.ui" />
    <import plugin="org.apache.xerces" />
</requires>
<extension point="org.eclipse.ui.popipMenus">
<viewerContribution id="ContributionEditorPopup"
    targetID="#CompilationUnitEditorContext">
<action id="ContributionEditorPopupAction"
    label="%somemodule.label"
    tooltip="%somemodule.tooltip"
    menubarPath="group.edit"
    class = "com.sun.s1studio.somemodule.eclipse.editor.EditorPopupAction" />
</viewerContrinution>
</extension>
. . . more extension points . . .
</plugin>
```

FIG. 1 is a flow diagram illustrating a method for extending custom application development environment modules from a first application development environment to a second application development environment in accordance with a specific embodiment of the present invention. The first application development environment may be NetBeans. The custom application development environment modules may collectively be Forte for Java. The second application development environment may be Eclipse. At 100, user interface elements for the second application development environment are created. At 102, user interface elements from the custom application development environment modules may be separated, forming user interface elements for the first application development environment. At 104, new general elements compatible with both the first application development environment and the second application development environment may be created. At 106, the new general elements may be combined with non-user interface elements from the custom application development environment modules to arrive at a series of generalized classes. At 108, one or more of the generalized classes may be referenced in the user interface elements for the first application development environment and the user interface elements for the second application development environment. At 110, a common ancestor for the user interface elements for the first application development environment and the user interface elements for the second application development environment may be created. At 112, a new manifest file for the second application development environment may be created.

Figure 2:
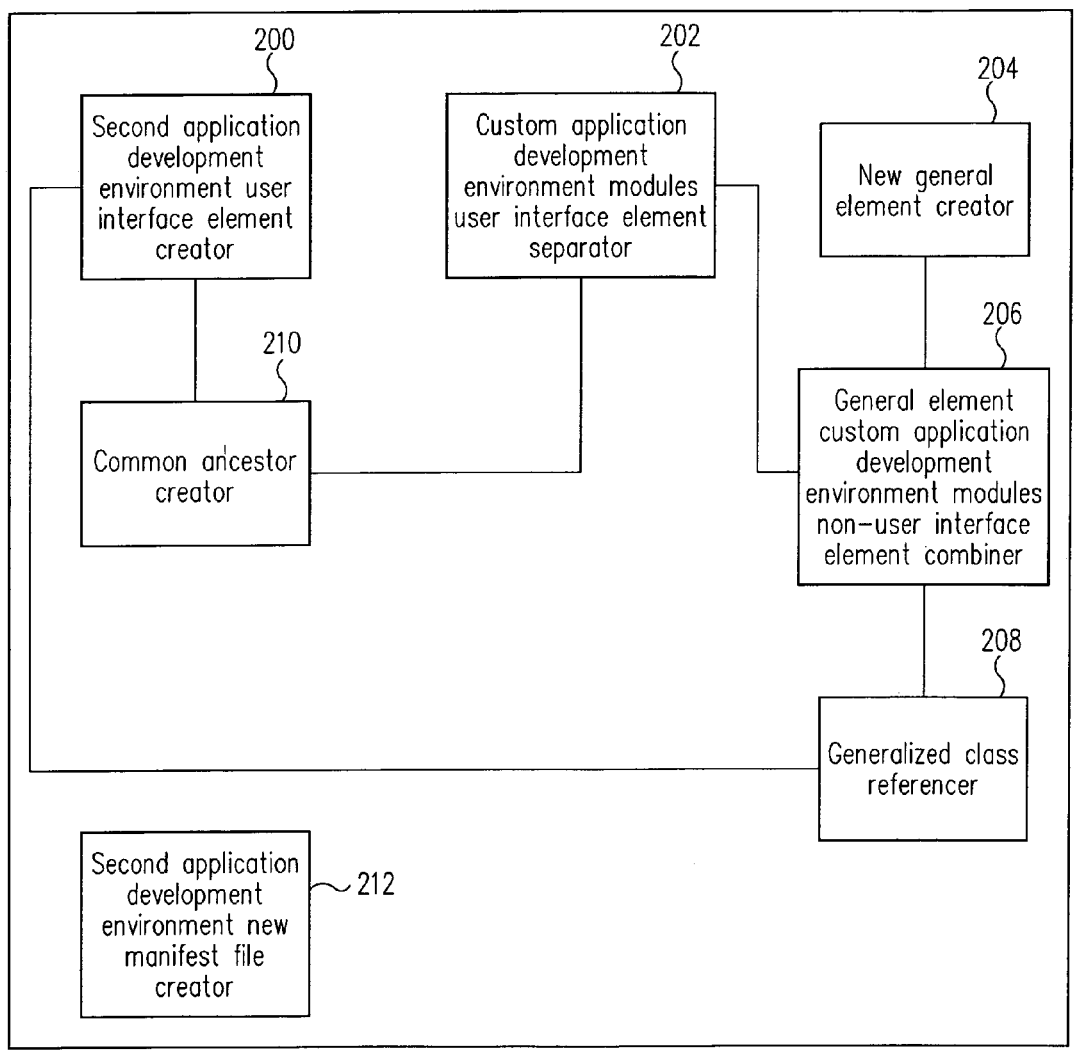
FIG. 2 is a block diagram illustrating a n apparatus for extending custom application development environment modules from a first application development environment to a second application development environment in accordance with a specific embodiment of the present invention.

FIG. 2 is a block diagram illustrating a n apparatus for extending custom application development environment modules from a first application development environment to a second application development environment in accordance with a specific embodiment of the present invention. The first application development environment may be NetBeans. The custom application development environment modules may collectively be Forte for Java. The second application development environment may be Eclipse. A second application development environment user interface element creator 200 may create user interface elements for the second application development environment. A custom application development environment modules user interface element separator 202 may separate user interface elements from the custom application development environment modules, forming user interface elements for the first application development environment. A new general element creator 204 may create new general elements compatible with both the first application development environment and the second application development environment. A general element custom application development environment modules non-user interface element combiner 206 coupled to the custom application development environment module user interface element separator 202 and to the new general element creator 204 may combine the new general elements with non-user interface elements from the custom application development environment modules to arrive at a series of generalized classes. A generalized class referencer 208 coupled to the general element custom application development environment modules non-user interface element combiner 206 and to the second application development environment user interface element creator 200 may reference one or more of the generalized classes in the user interface elements for the first application development environment and the user interface elements for the second application development environment. A common ancestor creator 210 coupled to the second application development environment user interface element creator 200 and to the custom application development environment module user interface element separator 202 may create a common ancestor for the user, interface elements for the first application development environment and the user interface elements for the second application development environment. A second application development environment new manifest file creator 212 may create a new manifest file for the second application development environment.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-based method for extending custom application development environment modules from a first application development environment to a second application development environment, the method comprising:
    creating user interface elements for the second application development environment wherein the second application development environment is used for any combination of writing, compiling, debugging, and deploying computer programs;
    separating user interface elements from the custom application development environment modules, forming user interface elements for the first application development environment wherein said custom application development environment modules extend the first application development environment; and said first application development environment is used for any combination of writing, compiling, debugging, and deploying computer programs;
    creating new general elements compatible with both the first application development environment and the second application development environment;
    combining said general elements with non-user interface elements from the custom application development environment modules to arrive at a series of generalized classes of an object-oriented computer programming language; and
    referencing one or more of said generalized classes in said user interface elements for the first application development environment and said user interface elements for the second application development environment.

2. The method of claim 1, wherein the first application development environment is NetBeans.

3. The method of claim 2, wherein the custom application development environment modules collectively are Forte for Java.

4. The method of claim 2, wherein the second application development environment is Eclipse.

5. The method of claim 1, further comprising:
    creating a new manifest file for the second application development environment.

6. The method of claim 1, wherein said user interface elements are graphical user interface elements.

7. The method of claim 1, further comprising creating a common ancestor for said user interface modules for the first application development environment and said second application development environment user interface modules.

8. A computer apparatus for extending custom application development environment modules from a first application development environment to a second application development environment, the apparatus comprising:
    a second application development environment user interface element creator wherein the second application development environment is used for any combination of writing, compiling, debugging, and deploying computer programs;
    a custom application development environment modules user interface element separator;
    a new general element creator;
    a general element custom application development environment modules non-user interface element combiner coupled to said custom application development environment module user interface element separator and to said new general element creator wherein said custom application development environment modules extend the first application development environment; and said first application development environment is used for any combination of writing, compiling, debugging, and deploying computer programs; and
    a generalized class referencer coupled to said general element custom application development environment modules non-user interface element combiner and to said second application development environment user interface element creator.

9. The apparatus of claim 8, further comprising a second application development environment new manifest file creator.

10. The apparatus of claim 8, further comprising a common ancestor creator coupled to the second application development environment user interface element creator and to said custom application development environment module user interface element separator.

11. A computer apparatus for extending custom application development environment modules from a first application development environment to a second application development environment, the apparatus comprising:
    means for creating user interface elements for the second application development environment wherein the second application development environment is used for any combination of writing, compiling, debugging, and deploying computer programs;
    means for separating user interface elements from the custom application development environment modules, forming user interface elements for the first application development environment wherein said custom application development environment modules extend the first application development environment; and said first application development environment is used for any combination of writing, compiling, debugging, and deploying computer programs;

means for creating new general elements compatible with both the first application development environment and the second application development environment;

means for combining said general elements with non-user interface elements from the custom application development environment modules to arrive at a series of generalized classes of an object-oriented computer programming language; and means for referencing one or more of said generalized classes in said user interface elements for the first application development environment and said user interface elements for the second application development environment.

12. The apparatus of claim 11, wherein the first application development environment is NetBeans.

13. The apparatus of claim 12, wherein the custom application development environment modules collectively are Forte for Java.

14. The apparatus of claim 12, wherein the second application development environment is Eclipse.

15. The apparatus of claim 11, further comprising:

means for creating a new manifest file for the second application development environment.

16. The apparatus of claim 11, wherein said user interface elements are graphical user interface elements.

17. The apparatus of claim 11, further comprising means for creating a common ancestor for said user interface modules for the first application development environment and said second application development environment user interface modules.

* * * * *